United States Patent [19]
Kora et al.

[11] Patent Number: 5,768,051
[45] Date of Patent: Jun. 16, 1998

[54] MAGNETIC DISK APPARATUS HAVING SHIELD SPACE DEFINED BY COVER AND BASE

[75] Inventors: Kazuhiro Kora, Tokyo; Shigeki Yanagihara, Tokorozawa, both of Japan

[73] Assignee: Kabushiki Kaisha Toshiba, Kawasaki, Japan

[21] Appl. No.: 733,444

[22] Filed: Oct. 18, 1996

Related U.S. Application Data

[63] Continuation of Ser. No. 357,877, Dec. 15, 1994, abandoned.

[30] Foreign Application Priority Data

Dec. 21, 1993 [JP] Japan ................................. 5-320711

[51] Int. Cl.⁶ ............................................. G11B 33/14
[52] U.S. Cl. ................................ 360/99.08; 360/97.02
[58] Field of Search ........................... 360/97.01, 97.02, 360/97.03, 98.07, 99.08, 99.12; 310/67 R, 90, 156

[56] References Cited

U.S. PATENT DOCUMENTS

| | | | |
|---|---|---|---|
| 4,363,056 | 12/1982 | Riggle et al. | 360/98 |
| 4,438,542 | 3/1984 | Schuh | 360/97 |
| 4,535,373 | 8/1985 | Schuh | 360/99.08 |
| 4,922,406 | 5/1990 | Schuh | 360/99.08 |
| 5,128,571 | 7/1992 | Itsu | 310/67 R |
| 5,173,814 | 12/1992 | Elsasser et al. | 360/98.07 |
| 5,177,650 | 1/1993 | Jabbari et al. | 360/99.08 |
| 5,195,002 | 3/1993 | Sakurai | 360/99.08 |
| 5,214,326 | 5/1993 | Yonei | 310/67 R |
| 5,424,887 | 6/1995 | Schuh | 360/99.08 |
| 5,426,548 | 6/1995 | Fujii et al. | 360/99.08 |
| 5,457,588 | 10/1995 | Hattori et al. | 360/99.08 |
| 5,490,021 | 2/1996 | Muller et al. | 360/99.08 |

FOREIGN PATENT DOCUMENTS 2-61884  3/1990  Japan .................. 360/97.02

*Primary Examiner*—Craig A. Renner
*Assistant Examiner*—Brian E. Miller
*Attorney, Agent, or Firm*—Limbach & Limbach LLP

[57] ABSTRACT

A magnetic disk apparatus includes a housing having a sealed spaced between a base and a cover plate. An electric motor is situated within the housing. The electric motor includes a shaft extending between the base and the cover plate, a rotor situated coaxially around the shaft, and a rolling bearing situated between the rotor and the shaft. A magnetic recording medium is supported on the rotor. The rotor has a seal portion interposed between the cover plate and the rolling bearing. The seal portion includes a first surface located near the outer peripheral surface of the shaft and defining a first gap between the first surface itself and the outer peripheral surface of the shaft and a second surface located near the cover plate and defining a second gap between the second surface itself and the cover plate. The first and second gaps communicate with each other to form a labyrinth seal between the space and the rolling bearing.

28 Claims, 11 Drawing Sheets

MAGNETIC DISK APPARATUS HAVING SHIELD SPACE DEFINED BY COVER AND BASE

This is a continuation of application Ser. No. 08/357,877 filed on Dec. 15, 1994 now abandoned.

BACKGROUND OF THE INVENTION

1. Field of the Invention

The present invention relates generally to a magnetic disk apparatus for use as an external memory of an information processing apparatus such as a portable computer, and more particularly to a structure of an electric motor for rotating a magnetic recording medium of the magnetic disk apparatus.

2. Description of the Related Art

With an increase in processing performance of a portable computer, there has been a demand for an increase in memory capacity of an external memory apparatus mounted in the computer. To meet the demand, the portable computer has recently been equipped with a so-called hard disk drive which is a magnetic disk apparatus having a much greater memory capacity and a much higher access speed than a floppy disk apparatus.

This type of magnetic disk apparatus is provided with a rectangular box-shaped housing. The housing comprises a base with a bottom wall, and a top cover placed on the base. A sealed clean space is defined between the base and the top cover. This space contains various functional parts such as a magnetic disk, an electric motor for rotating the magnetic disk at high speed, and a magnetic head for writing and reading data on the magnetic disk.

The electric motor for rotating the magnetic disk comprises a shaft, a rotor situated coaxially around the shaft, and first and second ball bearings for rotatably supporting the rotor around the shaft. The shaft is supported on the bottom wall of the base with use of a bracket. The rotor comprises a hollow cylindrical rotor yoke, to which magnetic disks are attached, and a hollow cylindrical hub situated coaxially inside the rotor yoke. The first and second ball bearings are arranged between the hub and the shaft. The first and second ball bearings are situated apart from each other in the axial direction of the shaft. The first ball bearing is situated near the bracket, and the second ball bearing is situated near the top cover.

A magnet is attached to the inner peripheral surface of the rotor yoke. A stator is situated between the magnet and the hub. The stator is supported on the bracket. Thus, a labyrinthine narrow gap is defined between the stator and the magnet and between the stator and the hub of the rotor. The gap communicates with an attachment part of the first ball bearing.

An end portion of the shaft, which is opposite to the other end portion thereof near the bracket, is supported by the top cover. Thus, the shaft extends between the top cover and the bottom wall of the base. Thereby, run-out of the shaft is prevented. Even if a plurality of magnetic disks are attached to the rotor and rotated, the attitude of the rotating magnetic disks is stabilized and the recording density of the magnetic disks can be increased.

In the meantime, it is known that dust occurs from the first and second ball bearings when the rotor of the electric motor is rotated at high speed. The dust is regarded as being caused by dispersion of a lubricant sealed in the ball bearings; in particular, by dispersion of the lubricant leaking from the second ball bearing situated near the top cover. Specifically, the first ball bearing situated near the bracket is surrounded by the bracket and hub and the labyrinthine narrow gap is present between the first ball bearing and the housing. The gap serves as a kind of labyrinth seal. Even if the lubricant leaks from the first ball bearing, it does not easily disperse to the space.

By contrast, the second ball bearing located near the top cover is exposed to the space. Consequently, the lubricant leaking from the second ball bearing is directly dispersed to the space with no shield. Once the lubricant adheres to the magnetic disks or a magnetic head, the data read/write performance of the disk apparatus deteriorates.

To solve this problem, for example, Jap. Pat. Appln. KOKAI Publication No. 3-283142 teaches a conventional magnetic disk apparatus wherein a magnetic fluid seal is provided on a top-cover-side end portion of the shaft. The magnetic fluid seal cuts off communication between the second ball bearing and the space, thus preventing dust from the second ball bearing from entering the space.

The provision of this magnetic fluid seal requires a working process of injecting a magnetic fluid into a gap between the shaft and the yoke located outside the shaft. The handling of the magnetic fluid is troublesome and consequently the magnetic disk apparatus cannot be assembled smoothly. In addition, since a magnet and a yoke for exclusive use in holding the magnetic fluid are required, the number of parts increases and the cost for the electric motor increases.

To solve this problem, a magnetic disk apparatus has been proposed, wherein the hub of the electric motor is provided with a seal portion interposed between the top cover and the second ball bearing, thereby dispensing with the magnetic fluid seal. The seal portion has a seal surface located close to the outer periphery surface of the shaft. The seal surface cooperates with the outer periphery surface of the shaft to define a narrow gap extending along the axis of the shaft. This gap functions as a kind of labyrinth seal for sealing dust produced from the second ball bearing within the inside of the rotor. In the case of this structure, in order to fully obtain a labyrinth seal effect, it is desired that the gap between the seal portion and the shaft be as narrow as possible and as long as possible along the axis of the shaft.

The housings of recently developed magnetic disk apparatus have been decreased in thickness more and more in accordance with a decrease in size of portable computers. A space between the second ball bearing and top cover has thus been decreasing more and more. In consideration of the size of the housing, it is not possible to elongate the seal portion along the axis of the shaft. As a result, the length of the seal portion cannot be increased sufficiently and the dust sealing performance deteriorates.

SUMMARY OF THE INVENTION

The present invention has been made in consideration of the above circumstances, and its object is to provide a magnetic disk apparatus capable of sealing dust produced from a bearing within the inside of a rotor, thereby preventing dispersion of the dust to the space in the housing of the apparatus.

According to an aspect of the invention, in order to achieve the above object, there is provided a magnetic disk apparatus comprising:

a housing having a base with a bottom wall, and a cover plate placed on the base, the housing having a sealed space defined between the base and the cover plate;

an electric motor situated in the space within the housing, the electric motor including a shaft supported between the bottom wall and the cover plate, a rotor situated coaxially around the shaft, and a bearing situated between the rotor and the shaft, the bearing supporting the rotor rotatably on an outer peripheral surface of the shaft;

a magnetic recording medium supported on the rotor and rotated along with the rotor within the space; and a magnetic head for writing and reading data on the magnetic recording medium, the magnetic head levitating over the magnetic recording medium while the magnetic recording medium is being rotated, wherein the rotor includes a seal portion interposed between the cover plate and the bearing, the seal portion includes a first surface located near the outer peripheral surface of the shaft and defining a first gap between the first surface itself and the outer peripheral surface of the shaft and a second surface located near the cover plate and defining a second gap between the second surface itself and the cover plate, and the first and second gaps communicate with each other to form a labyrinth seal between the space and the bearing.

According to the above structure, the labyrinth seal is formed from a space between the seal portion and the shaft to a space between the seal portion and the cover plate. Thus, the labyrinth seal extends not only in the axial direction of the shaft but also in the radial direction of the shaft, and the entire length of the labyrinth seal increases. Therefore, the seal effect can be fully exhibited, and the dust produced from the bearing can be surely sealed within the inside of the rotor.

According to another aspect of the invention, there is provided a magnetic disk apparatus comprising:

a housing having a base with a bottom wall, and a cover plate placed on the base, the housing having a sealed space defined between the base and the cover plate;

an electric motor situated in the space within the housing, the electric motor including a shaft supported between the bottom wall and the cover plate, a rotor situated coaxially around the shaft, and a bearing situated between the rotor and the shaft, the bearing supporting the rotor rotatably on an outer peripheral surface of the shaft;

a magnetic recording medium supported on the rotor and rotated along with the rotor within the space; and a magnetic head for writing and reading data, the magnetic head levitating over the magnetic recording medium while the magnetic recording medium is being rotated, wherein the rotor includes a seal member interposed between the cover plate and the bearing and formed of an element separate from the rotor, and the seal member cooperates with the outer peripheral surface of the shaft and the cover plate to form a gap constituting a labyrinth seal between the space and the bearing.

According to the above structure, the labyrinth seal is formed from a space between the seal portion and the shaft to a space between the seal portion and the cover plate. Thus, the labyrinth seal extends not only in the axial direction of the shaft but also in the radial direction of the shaft, and the entire length of the labyrinth seal increases. Therefore, the seal effect can be fully exhibited, and the dust produced from the bearing can be surely sealed within the inside of the rotor.

According to still another aspect of the invention, there is provided a magnetic disk apparatus comprising:

a housing having a base with a bottom wall, and a cover plate placed on the base, the housing having a sealed space defined between the base and the cover plate;

an electric motor situated in the space within the housing, the electric motor including a shaft supported between the bottom wall and the cover plate, a rotor situated coaxially around the shaft, and a bearing situated between the rotor and the shaft, the bearing supporting the rotor rotatably on an outer peripheral surface of the shaft;

a magnetic recording medium supported on the rotor and rotated along with the rotor within the space; and a magnetic head for writing and reading data, the magnetic head levitating over the magnetic recording medium while the magnetic recording medium is being rotated, wherein the rotor includes a first seal portion located near the outer peripheral surface of the shaft between the cover plate and the bearing, the cover plate includes a second seal portion located near the first seal portion, and the first and second seal portions cooperate to constitute a labyrinth seal between the bearing and the space.

According to this structure, the labyrinth seal includes a portion extending in the axial direction of the shaft and a portion extending in the radial direction of the shaft, and the entire length of the labyrinth seal increases. Therefore, the seal effect can be fully exhibited, and the dust produced from the bearing can be surely sealed within the inside of the rotor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A first embodiment of the present invention in which the invention is applied to a hard disk drive used in a portable computer will now be described with reference to FIGS. 1 to 4.

Figure 1:
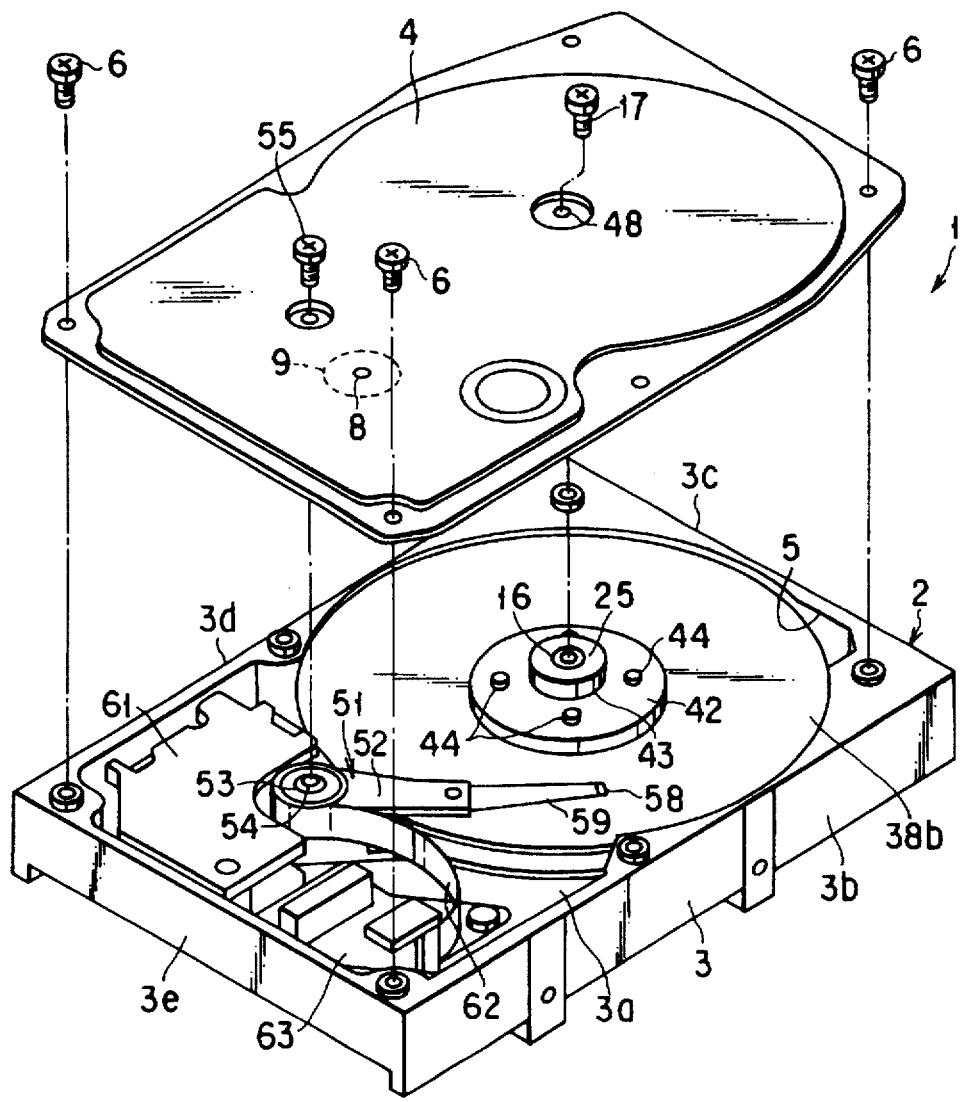
FIG. 1 is a perspective view of a magnetic disk apparatus in the state in which a top cover is removed from a base.

FIG. 1 shows a 2.5-inch large-capacity hard disk drive 1. The hard disk drive 1 has a metallic housing 2. The housing 2 has a flat rectangular box shape. The housing 2 comprises a base 3 and a top cover 4.

The base 3 is a die-cast product having a bottom wall 3a and four side walls 3b to 3e continuous with the bottom wall 3a. The base 3 has an opening 5 at a top region facing the bottom wall 3a. The top cover 4 is formed by pressing a metallic material in a flat plate shape. A peripheral portion of the top cover 4 is fixed to the side walls 3b to 3e of the base 3 by means of screws 6. The top cover 4 seals the opening 5 airtightly, with a packing (not shown) interposed. A sealed clean space 7 is defined between the top cover 4 and the base 3. As is shown in FIG. 1, the top cover 4 has a breezer hole 8 communicating with the space 7. The breezer hole 8 is covered with a filter 9. The space 7 in the housing 2 communicates with the outside atmosphere via the breezer hole 8, so that no difference in atmospheric pressure occurs between the space 7 and the outside of the housing 2.

Figure 3:
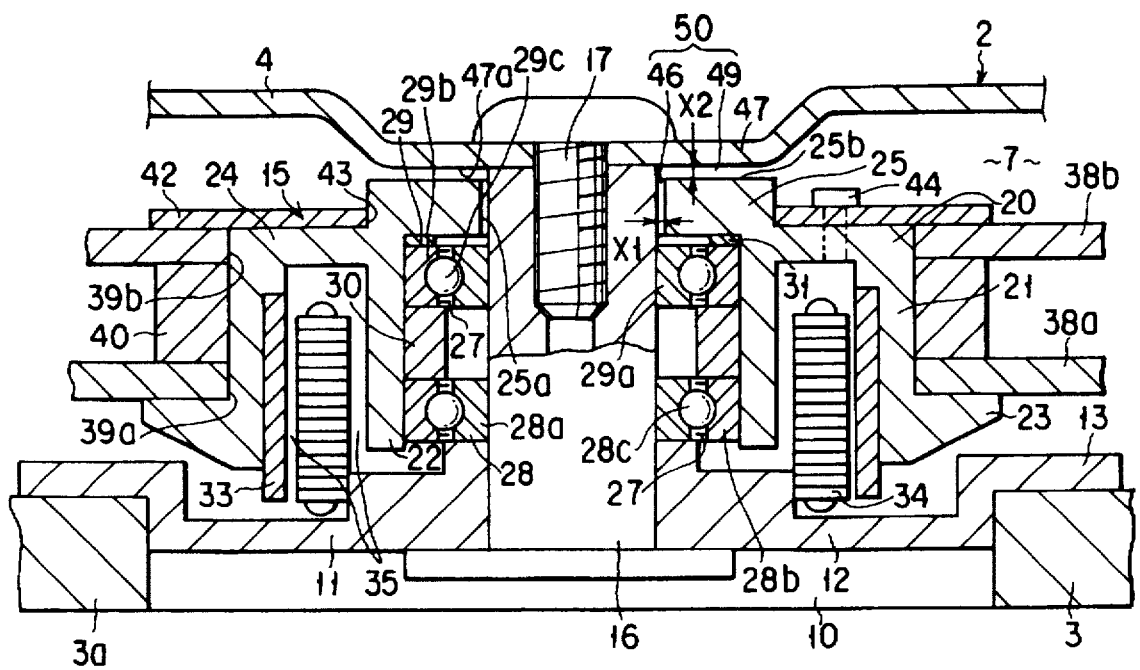
FIG. 3 is a cross-sectional view of the magnetic disk apparatus, showing the positional relationship between a rotor of an electric motor and the top cover.

As is shown in FIG. 3, the bottom wall 3a of the base 3 is provided with a motor mount hole 10. A motor bracket 11 is attached to the motor mount hole 10. The motor bracket 11 comprises a body 12 engaged in the motor mount hole 10, and a flange portion 13 continuous with an outer peripheral portion of the body 12. The flange portion 13 is fixed to the bottom wall 3a of the base 3 by means of screws (not shown). Thereby, the motor bracket 11 and base 3 are constituted as one unit.

An in-hub type electric motor 15 is supported on the motor bracket 11. The electric motor 15 is situated in the space 7 within the housing 2. The electric motor 15 includes a shaft 16 having a lower end portion and an upper end portion. The lower end portion of the shaft 16 is fixed to the body 12 of the motor bracket 11. The upper end portion of the shaft 16 abuts on the lower surface of the top cover 4 and is fixed to the top cover 4 by means of a screw 17. Thus, the shaft 16 extends between the base 3 and top cover 4 and is supported in the housing 2 at both ends.

As is shown in FIG. 3, a rotor 20 is situated coaxially around the shaft 16. The rotor 20 includes integrally a hollow cylindrical yoke 21, a hollow cylindrical hub 22 situated coaxially inside the rotor yoke 21 and a coupling wall 24 for coupling an upper end portion of the rotor yoke 21 and an upper end portion of the hub 22. The rotor yoke 21 has a disk support portion 23 extending radially outwards from a lower peripheral surface of the rotor yoke 21. A seal portion 25 is integrally formed on the upper end portion of the hub 22. The seal portion 25 extends from the hub 22 towards the outer periphery of the shaft 16 and has an annular shape surrounding the shaft 16. The seal portion 25 projects from the coupling wall 24 of hub 22 towards the top cover 4.

The rotor 20 is rotatably supported on the shaft 16 by means of first and second ball bearings 28 and 29. The first and second ball bearings 28 and 29 are arranged between the hub 22 of rotor 20 and the shaft 16. The first and second ball bearings 28 and 29 comprise inner races 28a and 29a tightly fitted in an outer peripheral surface of the shaft 16, outer races 28b and 29b tightly fitted in an inner peripheral surface of the hub 22, and balls 28c and 29c situated between the inner races 28a and 29a and the outer races 28b and 29b. A lubricant is sealed between the inner races 28a and 29a and the outer races 28b and 29b. Each of the outer races 28b and 29b is provided with a shield plate 27 for preventing leak of the lubricant.

The first and second ball bearings 28 and 29 are disposed apart from each other along the axis of the shaft 16. A spacer 30 is interposed between the outer races 28b and 29b of ball bearings 28 and 29, thereby setting a distance between the ball bearings 28 and 29. The first ball bearing 28 is located at the lower end of the hub 22. The inner race 28a of the first ball bearing 28 is put in contact with the motor bracket 11. The second ball bearing 29 is adjacent to the seal portion 25 of the rotor 20. The outer race 29b of second ball bearing 29 is put in indirect contact with the seal portion 25 via a bearing holder 31.

As is shown in FIG. 3, a magnet 33 is attached to the inner peripheral surface of the rotor yoke 21. The magnet 33 rotates with the rotor yoke 21 as one body. A stator 34 is situated between the magnet 33 and the hub 22. The stator 34 is fixed to the body 12 of the motor bracket 11. A narrow gap 35 is defined between the stator 34 and hub 22 and between the stator 34 and magnet 33. The course of the gap 35 meanders inside the rotor yoke 21 in a complex manner, as shown in FIG. 3. An end of the gap 35 communicates with the tightly fitting portion of the first ball bearing 28 via a gap between the upper surface of the body 12 and the lower end of the hub 22. The other end of the gap 35 communicates with the space 7 via a gap between the upper surface of the body 12 and the lower end of the rotor yoke 21.

Two magnetic disks 38a and 38b are engaged with the outer peripheral surface of the rotor yoke 21. The magnetic disks 38a and 38b have circular engaging holes 39a and 39b in their central areas. The outer peripheral surface of the rotor yoke 21 is engaged in the engaging holes 39a and 39b. The magnetic disks 38a and 38b are vertically arranged with a spacer ring 40 interposed.

Figure 2:
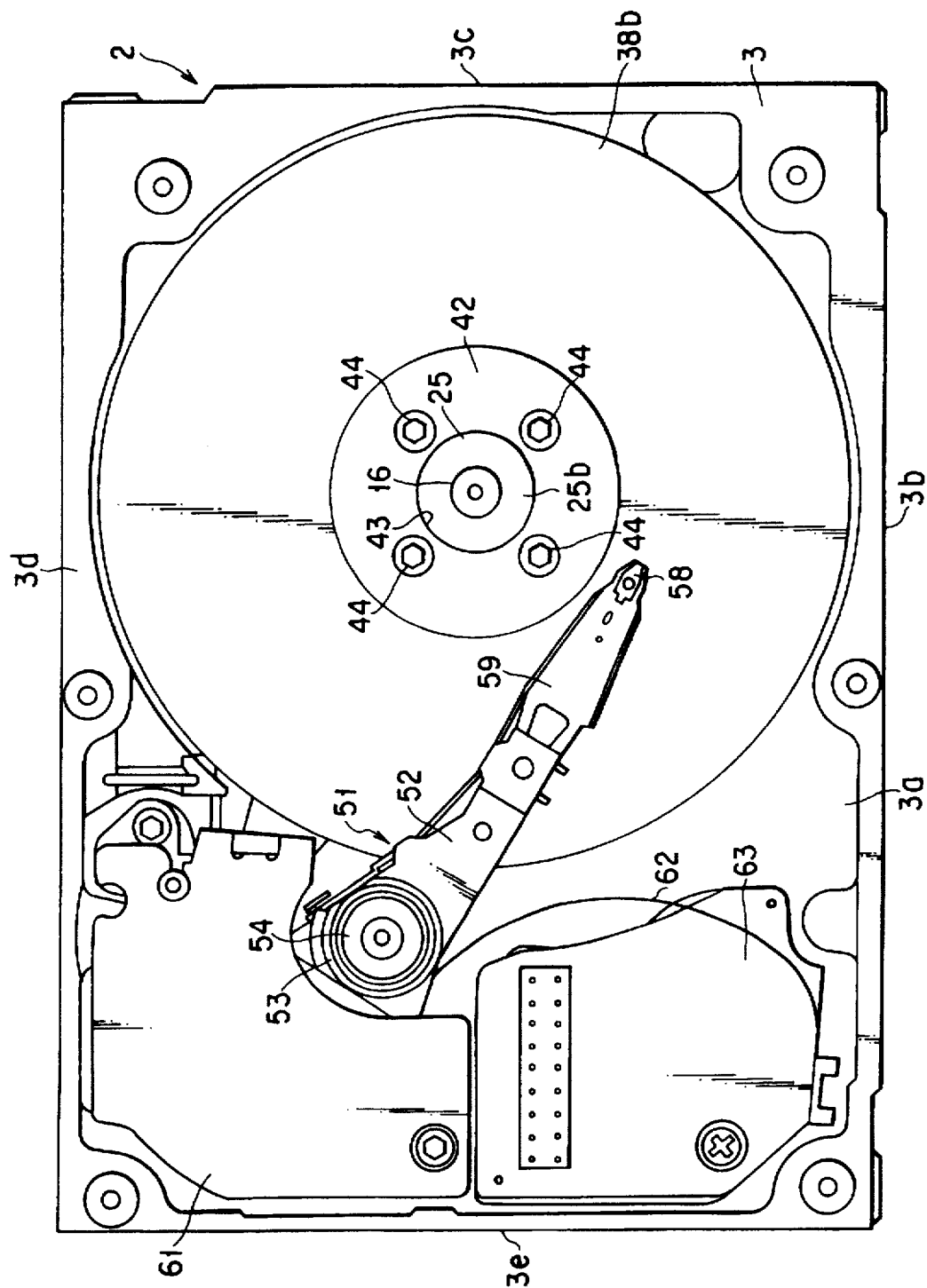
FIG. 2 is a plan view of the magnetic disk apparatus in which the top cover is removed from the base.

As is shown in FIGS. 1 to 3, a disk holder 42 is attached to the upper surface of the rotor 20. The disk holder 42 is formed in a ring shape having a central engaging hole 43. The seal portion 25 is engaged in the engaging hole 43. The outside diameter of the disk holder 42 is greater than that of the rotor yoke 21, and thus the outer peripheral lower surface of the disk holder 42 is put in contact with the upper magnetic disk 38b. The disk holder 42 is fixed on the upper surface of the coupling wall 24 of rotor 20 by means of screws 44. Thereby, the magnetic disks 38a and 38b and spacer ring 40 are clamped between the disk holder 42 and the disk support portion 23, and the magnetic disks 38a and 38b and rotor 20 are rotated as one unit.

The seal portion 25 of the rotor 20 has a first surface 25a located near the outer periphery surface of the shaft 16 and a second surface 25b continuous with the first surface 25a. The first surface 25a is continuous in the circumferential direction of the shaft 16 between the second ball bearing 29 and top cover 4. A first gap 46 is defined between the first surface 25a and the outer periphery surface of the shaft 16. The first gap 46 extends along the axis of the shaft 16 and communicates with the tightly fitting portion of the second ball bearing 29. The second surface 25b is opposed to the top cover 4. The second surface 25b extends in the radial direction of the shaft 16 and crosses the first surface 25a at right angles.

As is shown in FIG. 3, the top cover 4 receiving the upper end of the shaft 16 has a labyrinth forming portion 47. The labyrinth forming portion 47 is integrally formed on the top cover 4 when the top cover 4 is subjected to a pressing process. The part of the labyrinth forming portion 47, which is opposed to the rotor 20, is curved towards the space 7. The labyrinth forming portion 47 has substantially the same outside diameter as the hub 22 of rotor 20. The labyrinth forming portion 47 has a flat bottom surface, a central portion of which is penetrated by the screw 17. The bottom surface of the labyrinth forming portion 47 serves as a seal surface 47a extending in parallel to the second surface 25b of the seal portion 25. The seal surface 47a is close to the second surface 25b, and a second gap 49 is defined between the seal surface 47a and the second surface 25b. The second gap 49 extends in the radial direction of the shaft 16.

One end of the second gap 49 communicates with the upper end of the first gap 46 at the outer periphery surface of the shaft 16. The other end of the second gap 49 is open to the space 7 through a gap between the rotor 20 and the top cover 4. The second gap 49 cooperates with the first gap 46 to constitute a labyrinth seal 50. The labyrinth seal 50 is located between the second ball bearing 29 and the space 7 and is turned at right angles, as shown in FIG. 3. It is desirable that the dimension x2 of the second gap 49 of labyrinth seal 50, which is open to the space 7, be set at 0.3 mm or less, for the reason explained below.

It is known that the function of the ordinary hard disk apparatus 1 is fully performed if the amount (number) of dust particles each having a grain size of 0.1 μm or more, which are discharged to the space 7 from the gap between the rotor 20 and top cover 4, is 5,000 or less in 1 cubic feet (1/CF). The inventor of the present invention conducted experiments, as mentioned below, in order to study the relationship between the dimension x2 of the second gap 49 of the labyrinth seal 50 and the amount of dust discharged to the space 7 from the second gap 49.

Figure 4:
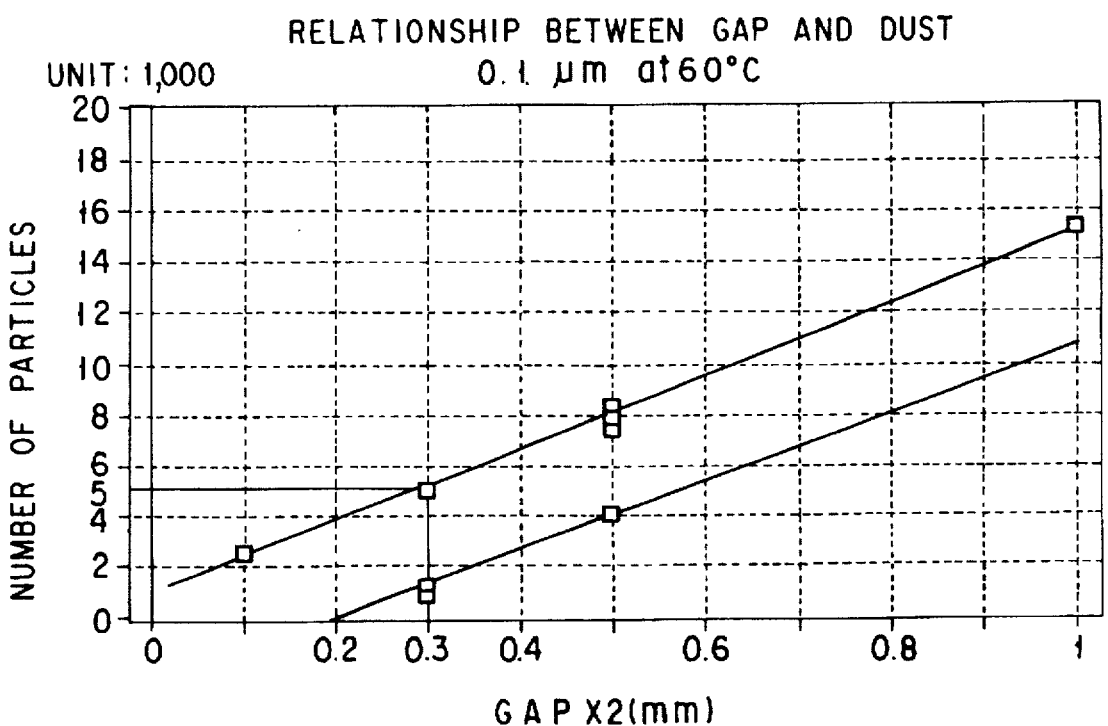
FIG. 4 is a characteristic graph showing the relationship between the size of the second gap and the amount of dust discharged to the space.

In the experiments, the following experimental models of the hard disk apparatus 1 were prepared with the same construction except the values of dimension x2 of the second gap: three models in which the dimension x2 of the second gap 49 is 0.1 mm; three models in which the dimension x2 of the second gap 49 is 0.3 mm; four models in which the dimension x2 of the second gap 49 is 0.5 mm; and one model in which the dimension x2 of the second gap 49 is 1.0 mm. In each model, the electric motor 15 was driven at an ambient temperature of 60° C., and it was measured how many dust particles each having a size of 0.1μ or more were present in 1/CF. FIG. 4 shows the results of measurement. FIG. 4 is a graph showing the relationship between the dimension x2 of the second gap 49 and the amount of dust discharged from the second gap 49. The abscissa indicates the dimension x2 (mm) of the second gap 49 and the ordinate indicates the number of dust particles discharged to the space 7.

As seen from FIG. 4, among the models in which the dimension x2 of the second gap 49 is 0.5 mm, the amount of dust was less than 5,000 in only one model. In the other three models, the dust amount was much greater than 5,000. It is understood that if the dimension x2 of the second gap 49 is 0.5 mm, the labyrinth seal effect is inadequate. Regarding the models in which the dimension x2 of the second gap 49 is 0.3 mm and 0.1 mm, the amount of dust was 5,000 or less in all models.

In order that the hard disk apparatus 1 can operate normally without influence of dust, it is necessary that the amount (number) of dust particles each having a size of 0.1 μm be 5,000 or less, as described above. It is understood, from the above measurement results, that this condition can be satisfied by setting the dimension x2 of the second gap 49 at 0.3 mm or less.

Since the first gap 46 is defined between the rotor 20 and shaft 16 which are structural elements of the electric motor 15, the dimension x1 can be set more precisely than the dimension x2 of the second gap 49. Accordingly, the dimension x1 of the first gap 46 is made less than the dimension x2 of the second gap 49, and the amount of dust can be easily reduced to 5,000 or less.

As is shown in FIGS. 1 and 2, a carriage assembly 51 is situated within the space 7 of the housing 2. The carriage assembly 51 is located adjacent to the magnetic disks 38a and 38b. The carriage assembly 51 has a carriage 52. The carriage 52 has a boss portion 53 at one end. The boss portion 53 is rotatably supported on the bottom wall 3a of base 3 via a support shaft 54. An upper end of the support shaft 54 is supported on the top cover 4 by means of a screw 55. The carriage 52 is thus rotatable on the support shaft 54.

A suspension 59 is attached to the carriage 52. The suspension 59 faces the magnetic disks 38a and 38b. A magnetic head 58 is supported at a distal end portion of the suspension 59. The magnetic head 58 functions to write data on the magnetic disks 38a and 38b and read data written on the magnetic disks 38a and 38b. The magnetic head 58 is located on data areas of the magnetic disks 38a and 38b. When the magnetic disks 38a and 38b are rotated by the electric motor 15, the magnetic head 58 levitates due to an air flow over the disks 38a and 38b. The amount of levitation of the magnetic head 58 is set at 0.1 micron or less. The carriage assembly 51 including the magnetic head 58 is connected to a control circuit board 63 via a flexible wiring board 62.

A voice coil motor 61 is situated within the housing 2. The voice coil motor 61 functions to rotate the carriage assembly 51. The voice coil motor 61 varies the rotational angle and rotational direction of the carriage assembly 51 so that the magnetic head 58 is positioned at desired tracks on the magnetic disks 38a and 38b and performs data write/read operations.

The magnetic disk apparatus 1 having the above construction is assembled in the following manner.

The motor bracket 11 of the electric motor 15 is fitted in the motor mount hole 10 of the base 3. The flange portion 13 of motor bracket 11 is fixed to the base 3 by screws. The electric motor 15 is thus fixed to the bottom wall 3a of the base 3.

In this state, two magnetic disks 38a and 38b and spacer ring 40 are alternately engaged with the outer peripheral surface of the rotor yoke 21. Lastly, the disk holder 42 is aligned on the upper surface of the rotor 20. The disk holder 42 is fixed to the coupling wall 24 of the rotor 20 by means of the screws 44. Thus, the magnetic disks 38a and 38b and spacer ring 40 are clamped between the disk holder 42 and the disk support portion 23, and the magnetic 38a and 38b are integrated with the rotor 20.

Subsequently, the carriage assembly 51, voice coil motor 61 and circuit board 63 are assembled on the bottom wall 3a of the base 3. The circuit board 63 is electrically connected via the flexible wiring board 62 to the electric motor 15, carriage assembly 51 and voice coil motor 61.

After the functional elements have been assembled on the base 3 and electrically connected, the top cover 4 is placed on the base 3 and fixed by screws 6. Thus, the opening 5 of the base 3 is airtightly sealed and the space 7 is defined between the base 3 and top cover 4. Accordingly, the various functional elements including the electric motor 15, magnetic disks 38a and 38b, carriage assembly 51 and voice coil motor 61 are all contained in the space 7.

When the opening 5 of the base 3 is sealed by the top cover 4, the labyrinth forming portion 47 of the top cover 4 faces the seal portion 25 of the rotor 20. In this state, the screw 17 is passed through the labyrinth forming portion 47 and engaged in the upper end portion of the shaft 16. Thereby, both end portions of the shaft 16 are supported by the housing 2. At the same time, the dimension x2 between the seal surface 47a of the labyrinth forming portion 47 and the second surface 25b of the seal portion 25 is determined. Thus, the second gap 49, which is a part of the labyrinth seal 50, is defined between the labyrinth forming portion 47 and the seal portion 25, and the assembly of the magnetic disk apparatus 1 is completed.

According to the first embodiment, the top cover 4 of the housing 2 has the labyrinth forming portion 47. When the top cover 4 is placed on the base 3, the second gap 49 extending in the radial direction of the shaft 16 is defined between the seal surface 47a of the labyrinth forming portion 47 and the second surface 25b of the seal portion 25. Since the second gap 49 communicates with the first gap 46 between the outer peripheral surface of the shaft 16 and the first surface 25a of the seal portion 25, the labyrinth seal 50 can be elongated by the distance corresponding to the second gap 49.

Thus, the labyrinth seal 50 extends in the radial direction of the shaft 16 and the entire length thereof increases. The labyrinth seal 50 is bent midway at right angles and the shape thereof is complicated. As a result, the seal effect by the labyrinth is enhanced and the dust produced from the second ball bearing 29 can be sealed in the inside of the rotor 20. Therefore, dispersion of dust to the space 7 can be surely prevented, adhesion of dust to the magnetic 38a and 38b and magnetic head 58 can be prevented, and a data write/read error can be prevented.

Although the first ball bearing 28 produces dust like the second ball bearing 29, the tightly fitted portion of the first ball bearing 28 communicates with the space 7 via the meandering gap 35. The gap 35 serves as a kind of labyrinth seal. Even if the lubricant leaks from the first ball bearing 28, the lubricant can be prevented from being dispersed to the space 7 as dust.

According to the method of assembling the above magnetic disk apparatus 1, the various functional elements including the electric motor 15 are assembled on the base 3, and then the top cover 4 is placed on the base 3. The labyrinth forming portion 47 of the top cover 4 is coupled to the upper end of the shaft 16 by means of the screw 17. Thus, the second gap 49 or a part of the labyrinth seal 50 is defined between the labyrinth forming portion 47 and the rotor 20.

Accordingly, the labyrinth seal 50 can be extended without performing troublesome working steps requiring strict management of dimensions, i.e. without providing special parts and assembling such special parts with high precision. Therefore, the magnetic disk apparatus 1 can be assembled easily with high workability.

Figure 5:
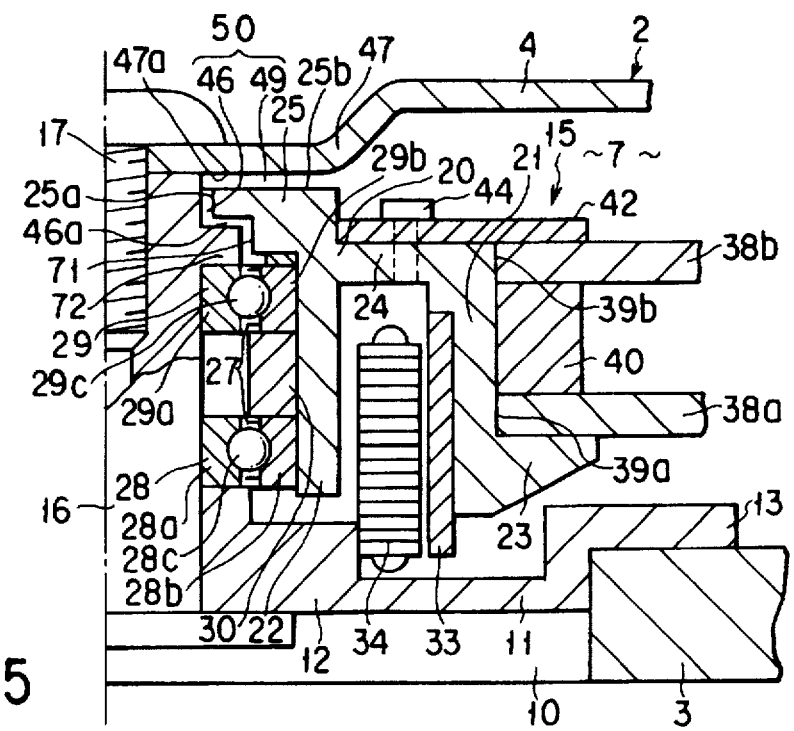
FIG. 5 is a cross-sectional view of a magnetic disk apparatus according to a second embodiment of the invention.

The present invention is not limited to the first embodiment. FIG. 5 shows a second embodiment of the invention.

The second embodiment differs principally from the first embodiment with respect to the structures of the shaft 16 and rotor 20. The other structural features are the same as those of the first embodiment.

As is shown in FIG. 5, the first surface 25a of the seal portion 25 is provided with a recess 71. The recess 71 has a ring shape and extends continuously in the circumferential direction of the shaft 16. The recess 71 is open to the first gap 46 and to the lower surface of the seal portion 25.

The shaft 16 includes integrally a large-diameter portion 72 opposed to the recess 71. The large-diameter portion 72 projects into the recess 71. The large-diameter portion 72 and recess 71 cooperate to define a crank-shaped bent portion 46a midway in the first gap 46.

According to the above structure, the first gap 46 is bent in a crank shape and therefore the entire length of the first gap 46 can be increased as much as possible in the space defined between the second ball bearing 29 and the labyrinth forming portion 47. In addition, since the shape of the first gap 46 is complicated, the labyrinth seal effect is enhanced and the amount of dust discharged to the space 7 is decreased.

Figure 6:
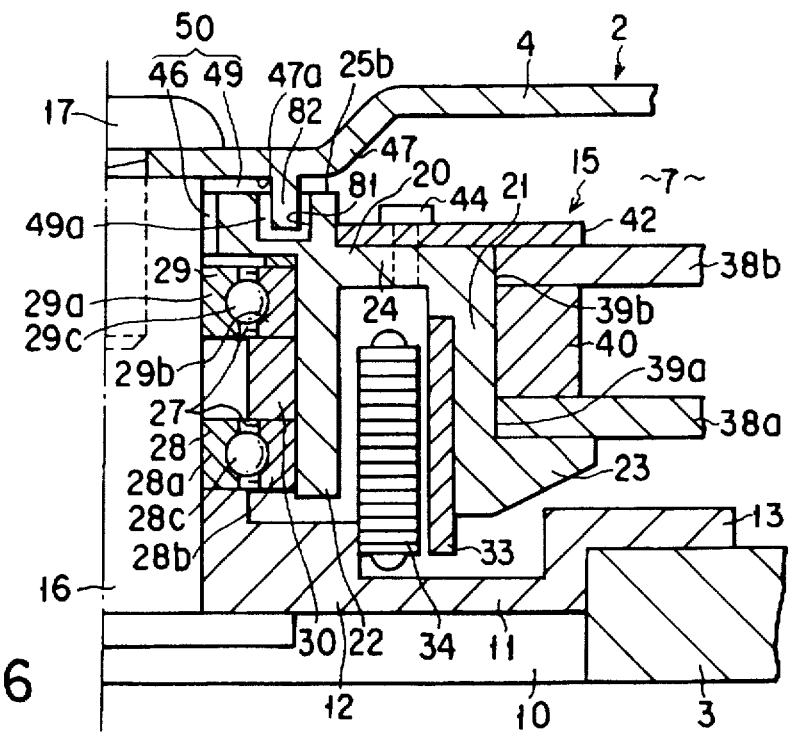
FIG. 6 is a cross-sectional view of a magnetic disk apparatus according to a third embodiment of the invention.

FIG. 6 shows a third embodiment of the invention.

In the third embodiment, the second surface 25b of the seal portion 25 is provided with a recess 81. The recess 81 has a ring shape and extends continuously in the circumferential direction of the shaft 16. The recess 81 is open to the second gap 49. The seal surface 47a of the labyrinth forming portion 47 is provided with a projection 82 projecting towards the second surface 25b. The projection 82 has a ring shape and extends continuously in the circumferential direction of the shaft 16. The projection 82 extends into the recess 81. The projection 82 and the recess 81 cooperate to define a crank-shaped bent portion 49a midway in the second gap 49.

According to the above structure, the second gap 49 is bent in a crank shape and therefore the entire length of the second gap 49 can be increased as much as possible in the space defined between the seal portion 25 and the labyrinth forming portion 47. In addition, since the shape of the second gap 49 is complicated, the labyrinth seal effect is enhanced and the amount of dust discharged to the space 7 is decreased.

Figure 7:
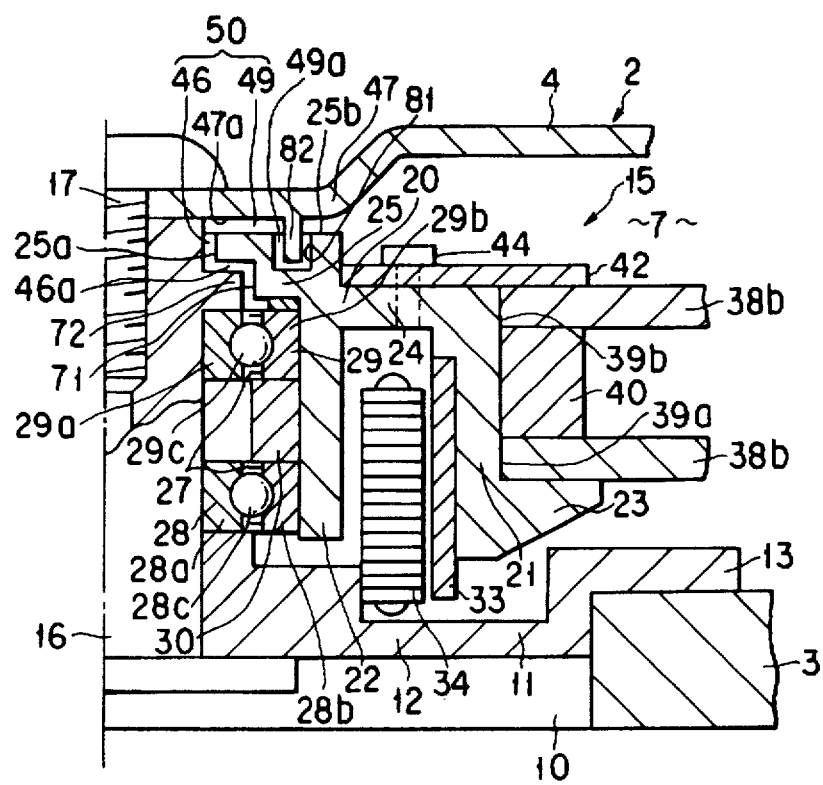
FIG. 7 is a cross-sectional view of a magnetic disk apparatus according to a fourth embodiment of the invention.

FIG. 7 shows a fourth embodiment of the invention. In the fourth embodiment, the second and third embodiments are combined.

As is shown in FIG. 7, the first surface 25a of the seal portion 25 is provided with a recess 71. The recess 71 has a ring shape and extends continuously in the circumferential direction of the shaft 16. The recess 71 is open to the first gap 46 and to the lower surface of the seal portion 25. The shaft 16 includes S integrally a large-diameter portion 72 opposed to the recess 71. The large-diameter portion 72 projects into the recess 71. The large-diameter portion 72 and recess 71 cooperate to define a crank-shaped bent portion 46a midway in the first gap 46.

The second surface 25b of the seal portion 25 is provided with a recess 81. The recess 81 has a ring shape and extends continuously in the circumferential direction of the shaft 16. The recess 81 is open to the second gap 49. The seal surface 47a of the labyrinth forming portion 47 is provided with a projection 82 projecting towards the second surface 25b. The projection 82 has a ring shape and extends continuously in the circumferential direction of the shaft 16. The projection 82 extends into the recess 81. The projection 82 and the recess 81 cooperate to define a crank-shaped bent portion 49a midway in the second gap 49.

According to the above structure, the first gap 46 is bent in a crank shape and therefore the entire length of the first gap 46 is increased as much as possible and the shape of the first gap 46 is complicated. In addition, since the second gap 49 is bent in a crank shape, the entire length of the second gap 49 is increased as much as possible and the shape of the second gap 49 is complicated. Therefore, the labyrinth seal effect is enhanced and the amount of dust discharged to the space 7 is decreased.

Figure 8:
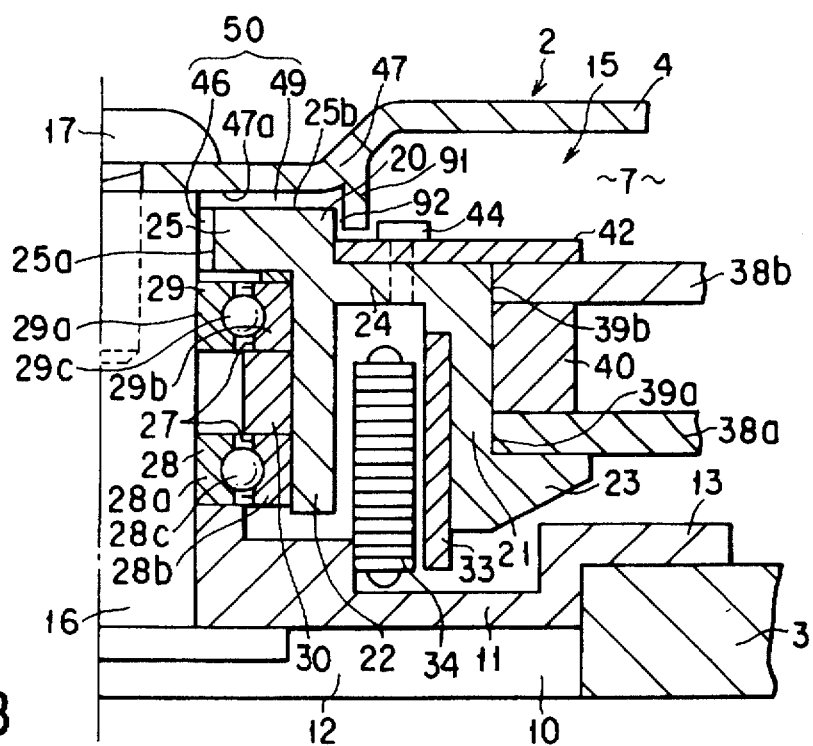
FIG. 8 is a cross-sectional view of a magnetic disk apparatus according to a fifth embodiment of the invention.

FIG. 8 shows a fifth embodiment of the invention.

The fifth embodiment differs from the first embodiment with respect to the structure of the labyrinth forming portion 47 of the top cover 4, and the other structural features are the same as those of the first embodiment.

As is shown in FIG. 8, the outer peripheral portion of the labyrinth forming portion 47 is provided with a cylindrical projection 91 projecting towards the rotor 20. The projection 91 coaxially covers the outside of the seal portion 25 of the rotor 20. A third gap 92 is defined between the inner peripheral surface of the projection 91 and the outer peripheral surface of the seal portion 25. The third gap 92 extends along the axis of the shaft 16. The third gap 92 communicates at one end with the second gap 49 and at the other end with the space 7 via a gap between the lower end of the projection 91 and the disk holder 42. By virtue of the presence of the third gap 92, the opening end of the labyrinth seal 50 to the space 7 is extended along the axis of the shaft 16.

According to the above structure, the entire length of the labyrinth seal 50 is increased and the shape of the labyrinth seal 50 is complicated. Thus, the labyrinth seal effect is enhanced and the amount of dust discharged to the space 7 is decreased.

Figure 9:
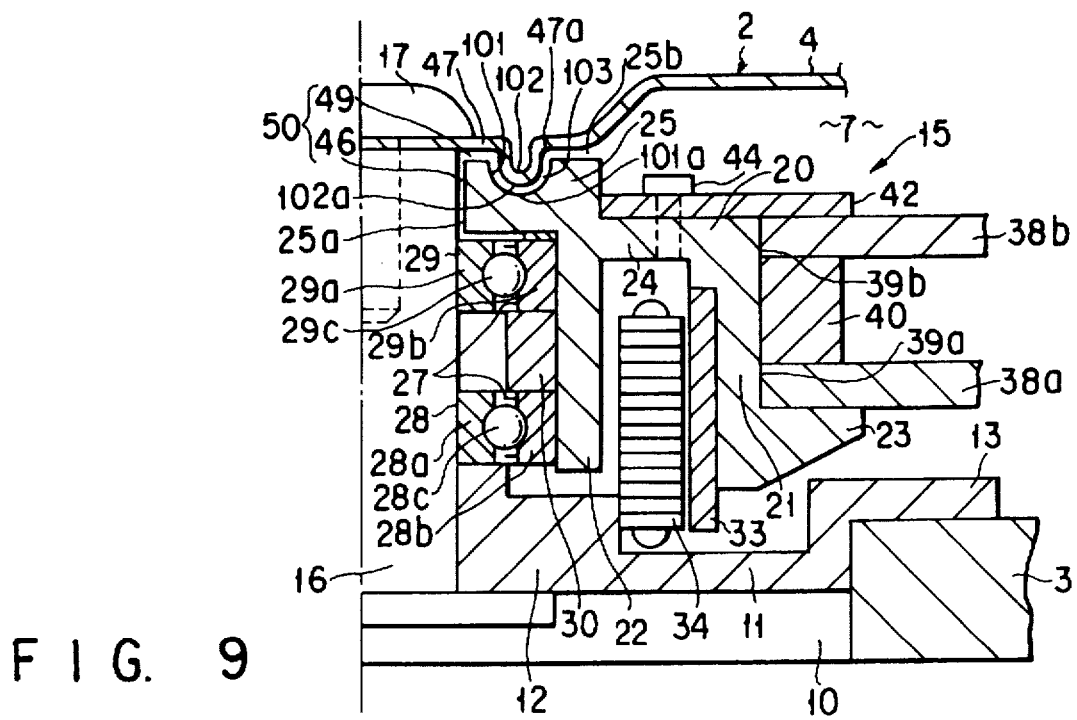
FIG. 9 is a cross-sectional view of a magnetic disk apparatus according to a sixth embodiment of the invention.

FIG. 9 shows a sixth embodiment of the invention.

In the sixth embodiment, the second surface 25b of the seal portion 25 is provided with a recess 101. The recess 101 has a ring shape and extends continuously in the circumferential direction of the shaft 16. The recess 101 is open to the second gap 49. A bottom surface 101a of the recess 101 is arcuated. The seal surface 47a of the labyrinth forming portion 47 is provided with a projection 102 projecting towards the second surface 25b. The projection 102 is formed integral with the labyrinth forming portion 47 when the top cover 4 is formed by pressing. The projection 102 has a ring shape and extends continuously in the circumferential direction of the shaft 16. A tip end face 102a of the projection 102 is arcuated. The projection 102 projects into the recess 101. The projection 102 and recess 101 cooperate to define an arcuated portion 103 midway in the second gap 49.

According to the above structure, since the second gap 49 is arcuated, the entire length of the second gap 49 can be increased as much as possible in the space defined between the seal portion 25 and the labyrinth forming portion 47. In addition, since the shape of the second gap 49 is complicated, the labyrinth seal effect is enhanced and the amount of dust discharged to the space 7 is decreased.

Figure 10:
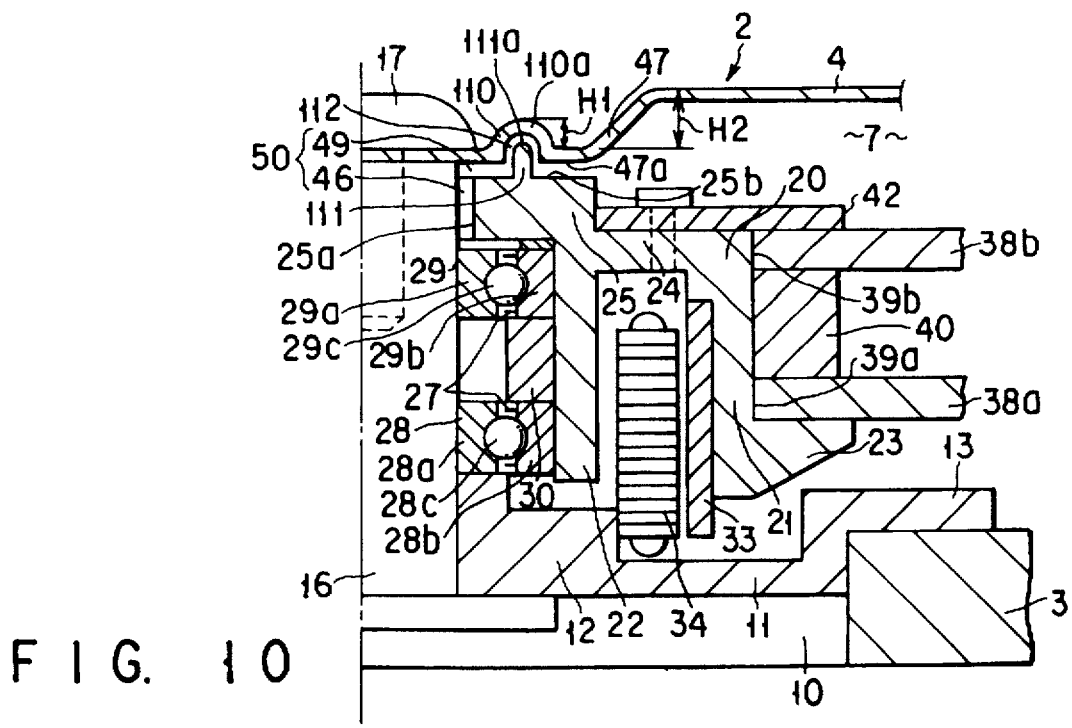
FIG. 10 is a cross-sectional view of a magnetic disk apparatus according to a seventh embodiment of the invention.

FIG. 10 shows a seventh embodiment of the invention.

In the seventh embodiment, the seal surface 47a of the labyrinth forming portion 47 is provided with a recess 110. The recess 110 is formed integral with the labyrinth forming portion 47 when the top cover 4 is formed by pressing. The recess 110 is open to the second gap 49. The recess 110 is curved away from the second surface 25b of the seal portion 25. A bottom surface 110a of the recess 110 is arcuated. The depth Hi of the recess 110 is less than the depth H2 of the labyrinth forming portion 47.

The second surface 25b of the seal portion 25 is provided with a projection 111. The projection 111 projects towards the second gap 49. The projection 111 has a ring shape and extends continuously in the circumferential direction of the shaft 16. A tip end surface 111a of the projection 111 is arcuated. The projection 111 projects into the recess 110. The projection 111 and recess 110 cooperate to define an arcuated portion 112 midway in the second gap 49.

According to the above structure, since the second gap 49 is arcuated, the entire length of the second gap 49 can be increased as much as possible in the space defined between the seal portion 25 and the labyrinth forming portion 47. In addition, since the shape of the second gap 49 is complicated, the labyrinth seal effect is enhanced and the amount of dust discharged to the space 7 is decreased.

Moreover, according to the above structure, since the recess 110 is located inside the labyrinth forming portion 47, the recess 110 does not project from the top cover 4. Thus, the thickness of the housing 2 does not increase.

Figure 11:
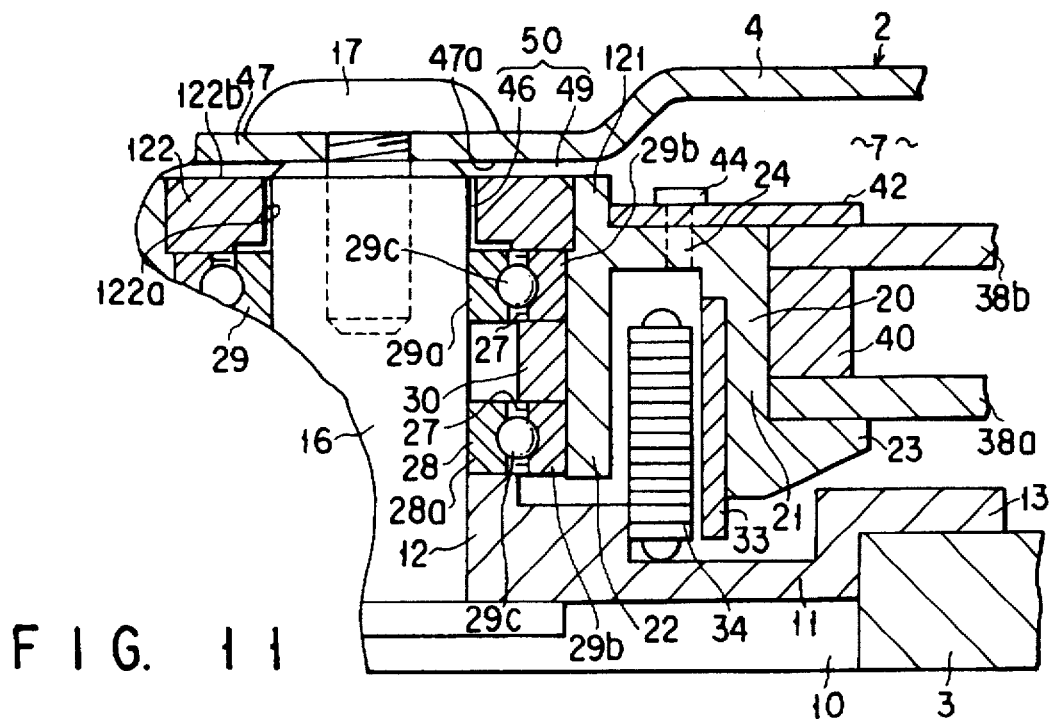
FIG. 11 is a cross-sectional view of a magnetic disk apparatus according to an eighth embodiment of the invention.

FIG. 11 shows an eighth embodiment of the invention.

The eighth embodiment differs from the first embodiment with respect to the structure of the rotor 20, and the other structural features are the same as those of the first embodiment.

As is shown in FIG. 11, a cylindrical portion 121 is provided on a top end portion of the hub 22. The cylindrical portion 121 is coaxial with the hub 22 and extends along the axis of the hub 22. An annular seal member 122 is provided inside the cylindrical portion 121. The seal member 122 is an element separate from the rotor 20 and is fixed inside the cylindrical portion 121 by means of, e.g. fitting under pressure. The seal member 122 is in contact with the outer race 29b of the second ball bearing 29 and has another function of positioning the second ball bearing 29.

The seal member 122 has a first surface 122a located adjacent to the outer periphery surface of the shaft 16 and a second surface 122b continuous with the first surface 122a. The first surface 122a is continuous in the circumferential direction of the shaft 16 between the second ball bearing 29 and top cover 4. A first gap 46 is defined between the first surface 122a and the outer periphery surface of the shaft 16. The second surface 122b is continuous and flush with the upper end surface of the cylindrical portion 121. The second surface 122b is close to the seal surface 47a of the labyrinth forming portion 47. A second gap 49 is defined between the second surface 122b and the seal surface 47a. The second gap 49 cooperates with the first gap 46 to constitute a labyrinth seal 50.

According to the above structure, the labyrinth seal 50 can be extended in the radial direction of the shaft 16 and the labyrinth seal effect is enhanced. Furthermore, since there is no need to provide a portion extending radially inward of the hub 22 on the upper end portion of the rotor 20, the shape of the rotor 20 can be simplified. Thus, the manufacturing cost of the electric motor 15 can be reduced.

Figure 12:
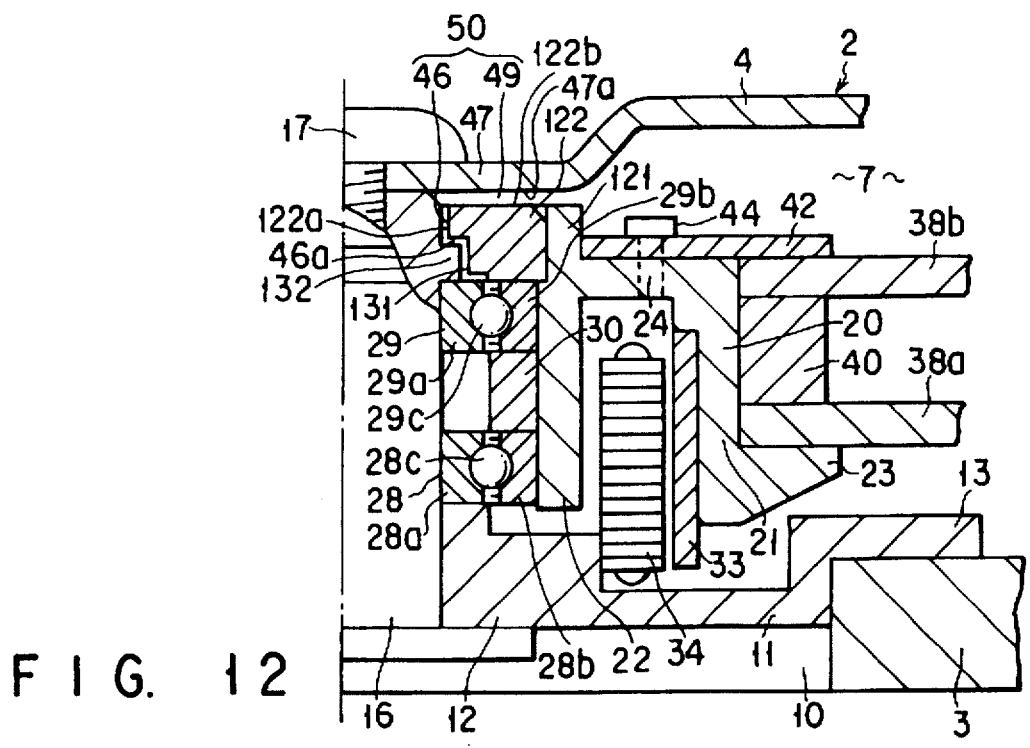
FIG. 12 is a cross-sectional view of a magnetic disk apparatus according to a ninth embodiment of the invention.

FIG. 12 shows a ninth embodiment of the invention.

The ninth embodiment differs from the eighth embodiment with respect to the shapes of the seal member 122 and shaft 16. As is shown in FIG. 12, the first surface 122a of the seal member 122 is provided with a recess 131. The recess 131 has a ring shape and extends continuously in the circumferential direction of the shaft 16. The recess 131 is open to the first gap 46 and the lower surface of the seal member 122.

The shaft 16 includes integrally a large-diameter portion 132 opposed to the recess 131. The large-diameter portion 132 projects into the recess 131 while being in contact with the inner race 29a of the second ball bearing 29. The large-diameter portion 132 and recess 131 cooperate to define a crank-shaped bent portion 46a midway in the first gap 46.

According to the above structure, the first gap 46 is bent in a crank shape and therefore the entire length of the first gap 46 can be increased as much as possible in the space defined between the second ball bearing 29 and the labyrinth forming portion 47. In addition, since the shape of the first gap 46 is complicated, the labyrinth seal effect is enhanced and the amount of dust discharged to the space 7 is decreased.

Figure 13:
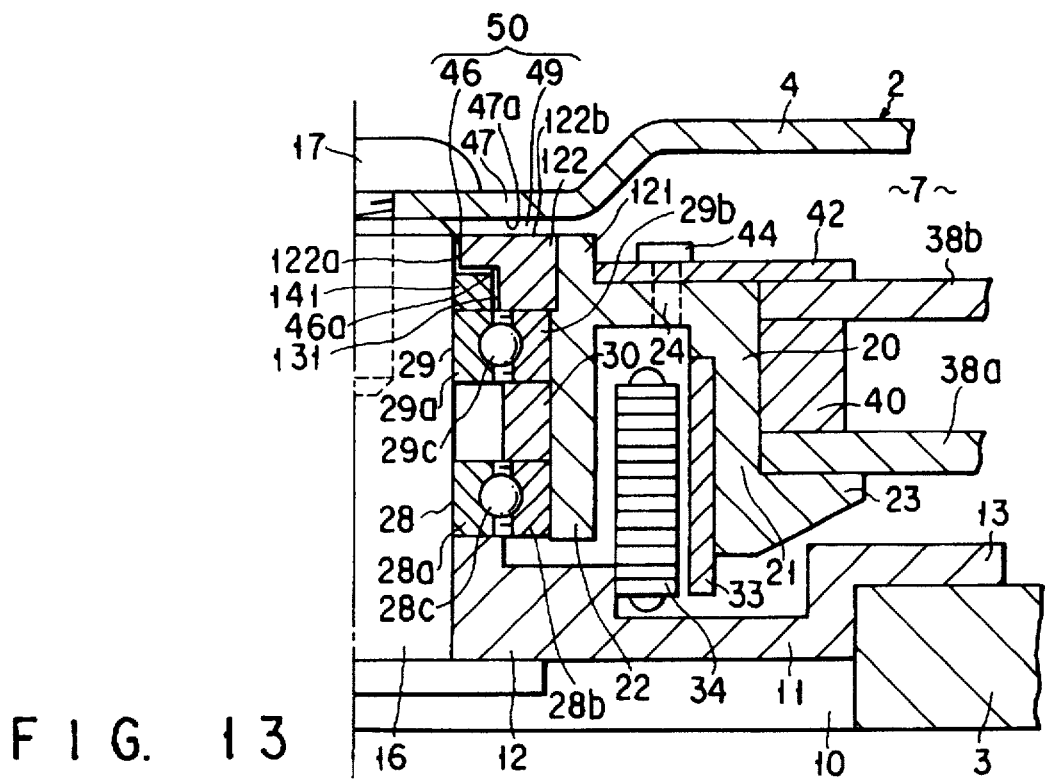
FIG. 13 is a cross-sectional view of a magnetic disk apparatus according to a tenth embodiment of the invention.

FIG. 13 shows a tenth embodiment of the invention.

In the tenth embodiment, an annular member 141 having a greater diameter than the shaft 16 is fixed to an upper end portion of the shaft 16 by means of, e.g. fitting under pressure. The annular member 141 projects into the recess 131 of the seal member 122 while being in contact with the inner race 29a of the second ball bearing 29. The annular member 141 and recess 131 cooperate to define a crank-shaped bent portion 46a midway in the first gap 46.

According to the above structure, there is no need to form a large-diameter portion integrally on the upper end portion of the shaft 16, and the shaft 16 itself has a straight shape with no stepped portion. Thus, the shape of the shaft 16 is simplified, while the first gap 46 is bent in a crank shape.

Figure 14:
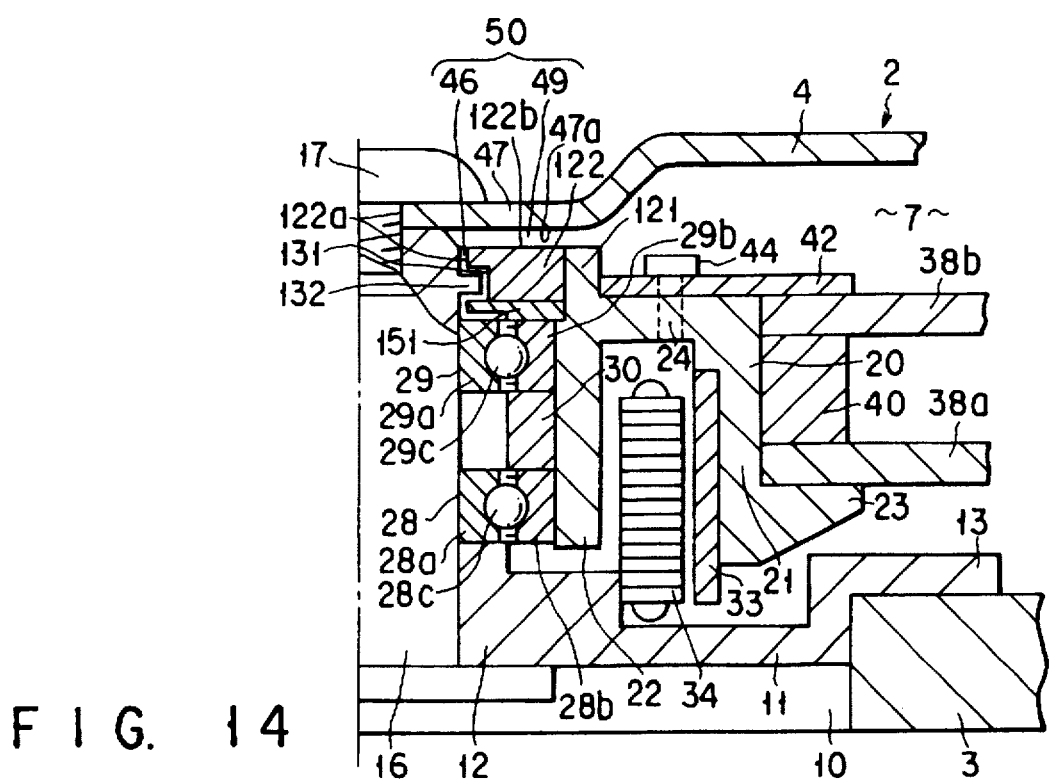
FIG. 14 is a cross-sectional view of a magnetic disk apparatus according to an eleventh embodiment of the invention.

FIG. 14 shows an eleventh embodiment of the invention. The eleventh embodiment differs from the eighth to tenth embodiments with respect to the structure for bending the first gap 46 in a crank shape.

As is shown in FIG. 14, a large-diameter portion 132 of the shaft 16 is situated apart from the inner race 29a of the second ball bearing 29 in the axial direction of the shaft 16. An annular spacer 151 is interposed between the second ball bearing 29 and the seal member 122. An inner peripheral portion of the spacer 151 is placed between the large-diameter portion 132 of the shaft 16 and the inner race 29a of the second ball bearing 29. The inner peripheral surface of the spacer 151 is located close to the outer peripheral surface of the shaft 16. Accordingly, the first gap 46 is bent once more between the second ball bearing 29 and the large-diameter portion 132. As compared to the eighth to tenth embodiments, the number of bent portions of the first gap 46 is increased by one.

According to the above structure, the entire length of the first gap 46 is increased and the shape of the first gap 46 is complicated. Thus, the labyrinth seal effect is enhanced and the dispersion of dust to the space 7 can be effectively prevented.

Figure 15:
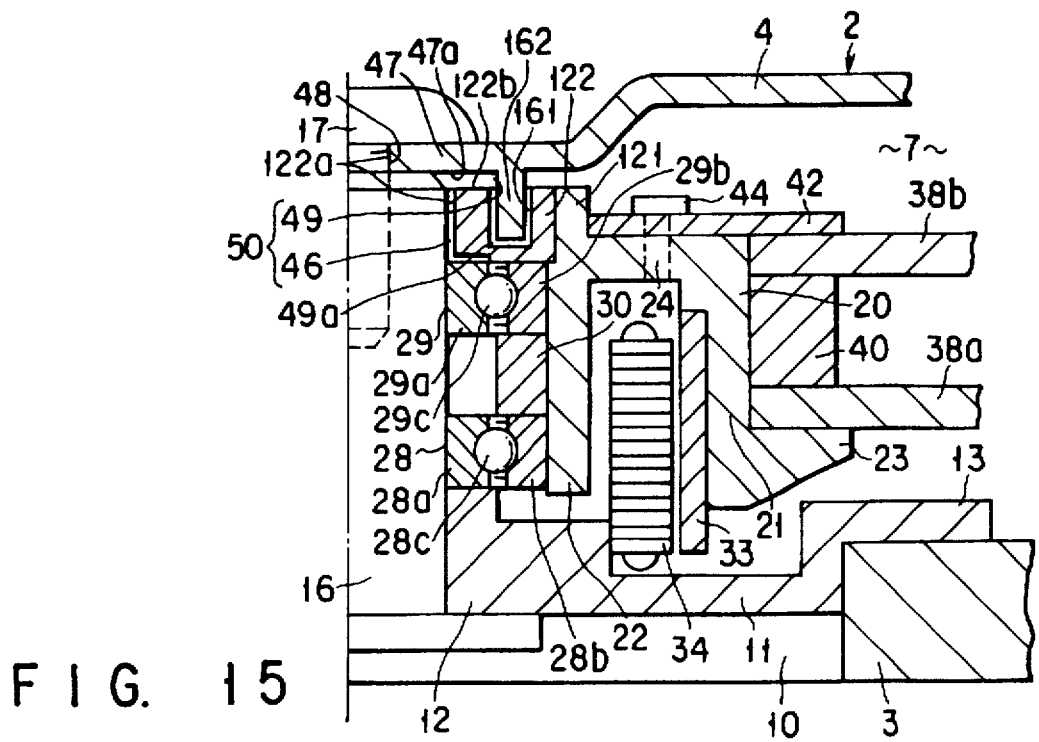
FIG. 15 is a cross-sectional view of a magnetic disk apparatus according to a twelfth embodiment of the invention.

FIG. 15 shows a twelfth embodiment of the invention.

In the twelfth embodiment, the second surface 122b of the seal member 122 is provided with a recess 161. The recess 161 has a ring shape and extends continuously in the circumferential direction of the shaft 16. The recess 161 is open to the second gap 49. The seal surface 47a of the labyrinth forming portion 47 is provided with a projection 162 projecting towards the second surface 122b. The projection 162 has a ring shape and extends continuously in the circumferential direction of the shaft 16. The projection 162 projects into the recess 161. The projection 162 and recess 161 cooperate to define a crank-shaped bent portion 49a midway in the second gap 49.

According to the above structure, since the second gap 49 is bent in a crank shape, the entire length of the second gap 49 can be increased as much as possible in the space defined between the seal member 122 and the labyrinth forming portion 47. In addition, since the shape of the second gap 49 is complicated, the labyrinth seal effect is enhanced and the amount of dust discharged to the space 7 is reduced.

Figure 16:
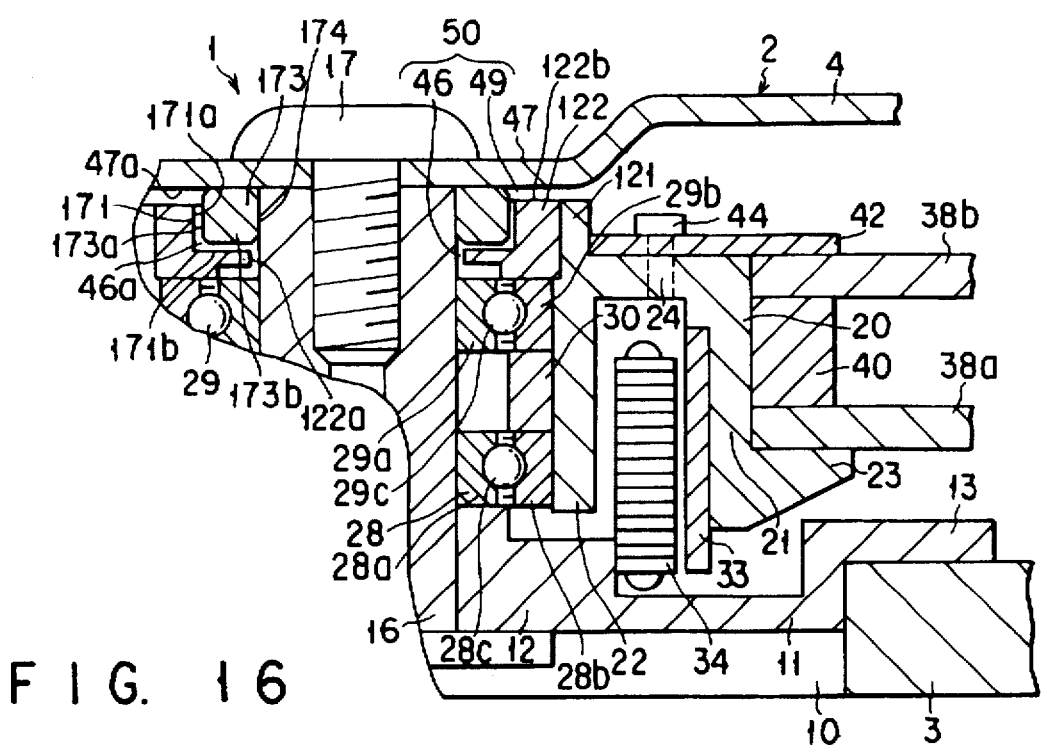
FIG. 16 is a cross-sectional view of a magnetic disk apparatus according to a 13th embodiment of the invention.

FIG. 16 shows a 13th embodiment of the invention.

In the 13th embodiment, the first surface 122a of the seal member 122 is provided with a recess 171. The recess 171 is continuous in the circumferential direction of the shaft 16. The recess 171 is continuous with and open to the second surface 122b of the seal member 122 and communicates with the second gap 49. The recess 171 has a first labyrinth forming surface 171a and a second labyrinth forming surface 171b. The first labyrinth forming surface 171a extends along the axis of the shaft 16, and the second labyrinth forming surface 171b extends in the radial direction of the shaft 16 from the lower end of the first labyrinth forming surface 171a.

An annular end member 173 is fixed to the seal surface 47a of the labyrinth forming portion 47. The end member 173 is an element separate from the top cover 4. The end member 173 has a central through-hole 174 in which the shaft 16 is fitted. The end member 173 is located in the recess 171 of the seal member 122. The end member 173 has a third labyrinth forming surface 173a opposed to the first labyrinth forming surface 171a, and a fourth labyrinth forming surface 173b opposed to the second labyrinth forming surface 171b. The first to fourth labyrinth forming surfaces 171a, 171b, 173a and 173b cooperate to define a crank-shaped bent portion 46a midway in the first gap 46.

According to the 13th embodiment with the above structure, since the first gap 46 of the labyrinth seal 50 is bent in a crank shape, the entire length of the first gap 46 can be increased as much as possible in the limited space. Furthermore, since the shape of the first gap 46 is complicated, the labyrinth seal effect is enhanced and the dispersion of dust to the space 7 is surely prevented.

Figure 17:
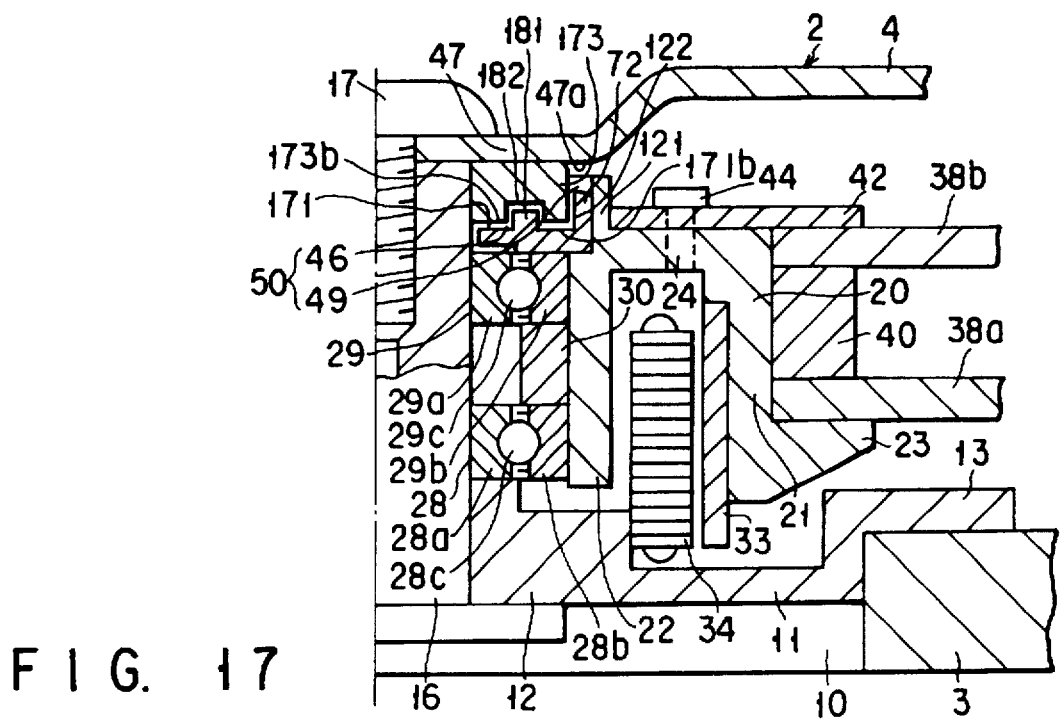
FIG. 17 is a cross-sectional view of a magnetic disk apparatus according to a 14th embodiment of the invention.

FIG. 17 shows a 14th embodiment of the invention.

In the 14th embodiment, the second labyrinth forming surface 171b of the recess 171 is provided with a projection 181. The projection 181 extends continuously in the circumferential direction of the shaft 16. The fourth labyrinth forming surface 173b of the end member 173 is provided with a recess 182. The recess 182 extends continuously in the circumferential direction of the shaft 16. The projection 181 projects into the recess 182. Thus, the first gap 46 is also bent in a crank shape between the second labyrinth forming surface 171b and fourth labyrinth forming surface 173b. As compared to the 13th embodiment, the number of bent portions of the first gap 46 is increased.

According to the 14th embodiment with the above structure, the entire length of the first gap 46 is increased and the shape of the first gap 46 is complicated. Therefore, the labyrinth seal effect is further enhanced and the dust produced from the second ball bearing 29 can be surely sealed inside the rotor 20.

Figure 18:
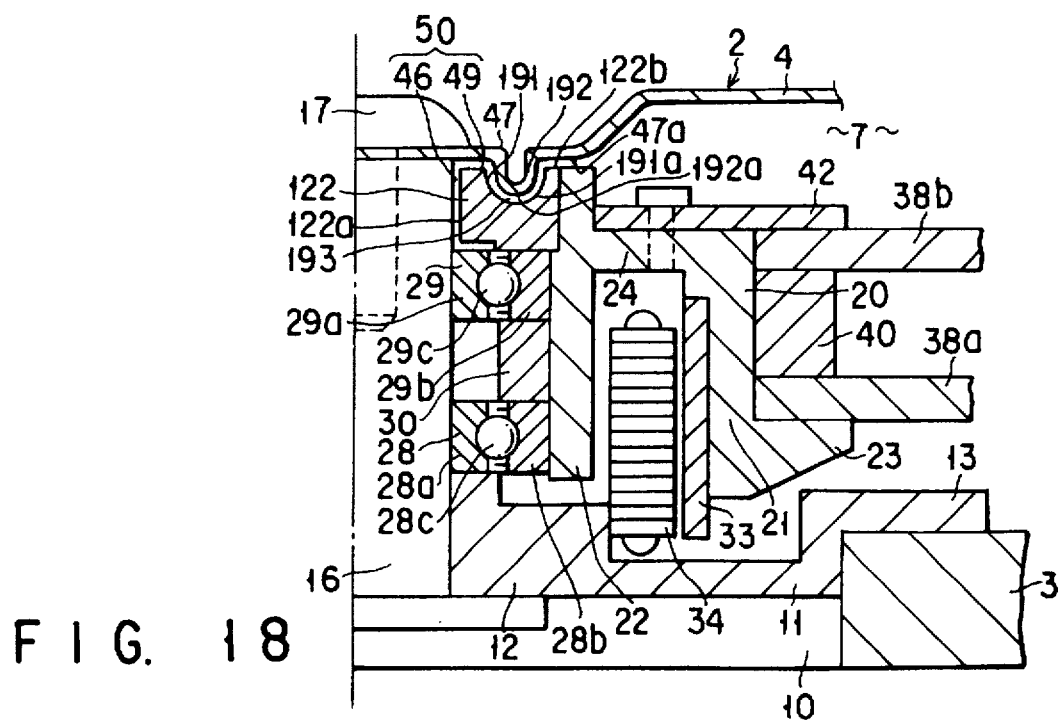
FIG. 18 is a cross-sectional view of a magnetic disk apparatus according to a 15th embodiment of the invention.

FIG. 18 shows a 15th embodiment of the invention.

In the 15th embodiment, the second surface 122b of the seal member 122 is provided with a recess 191. The recess 191 has a ring shape and extends continuously in the circumferential direction of the shaft 16. The recess 191 is open to the second gap 49. A bottom surface 191a of the recess 191 is arcuated. The seal surface 47a of the labyrinth forming portion 47 is provided with a projection 192 projecting towards the second surface 122b. The projection 192 is formed integral with the labyrinth forming portion 47 when the top cover 4 is formed by pressing. The projection 192 has a ring shape and extends continuously in the circumferential direction of the shaft 16. A tip end face 192a of the projection 192 is arcuated. The projection 192 projects into the recess 191. The projection 192 and recess 191 cooperate to define an arcuated portion 193 midway in the second gap 49.

According to the above structure, since the second gap 49 is arcuated, the entire length of the second gap 49 can be increased as much as possible in the space defined between the seal member 122 and the labyrinth forming portion 47. In addition, since the shape of the second gap 49 is complicated, the labyrinth seal effect is enhanced and the amount of dust discharged to the space 7 is decreased.

Figure 19:
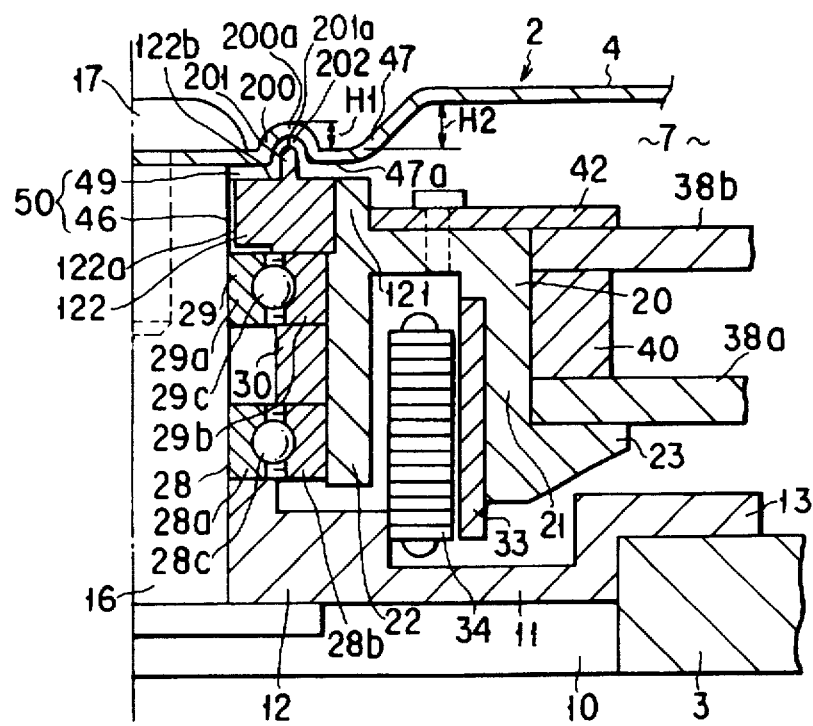
FIG. 19 is a cross-sectional view of a magnetic disk apparatus according to a 16th embodiment of the invention.

FIG. 19 shows a 16th embodiment of the invention.

In the 16th embodiment, the seal surface 47a of the labyrinth forming portion 47 is provided with a recess 200. The recess 200 is formed integral with the labyrinth forming portion 47 when the top cover 4 is formed by pressing. The recess 200 is open to the second gap 49. The recess 200 is curved away from the second surface 122b of the seal member 122. A bottom surface 200a of the recess 200 is arcuated. The depth H1 of the recess 200 is less than the depth H2 of the labyrinth forming portion 47.

The second surface 122b of the seal member 122 is provided with a projection 201. The projection 201 projects towards the second gap 49. The projection 201 has a ring shape and extends continuously in the circumferential direction of the shaft 16. A tip end surface 201a of the projection 201 is arcuated. The projection 201 projects into the recess 200. The projection 201 and recess 200 cooperate to define an arcuated portion 202 midway in the second gap 49.

According to the above structure, since the second gap 49 is arcuated, the entire length of the second gap 49 can be increased as much as possible in the space defined between the seal member 122 and the labyrinth forming portion 47. In addition, since the shape of the second gap 49 is complicated, the labyrinth seal effect is enhanced and the amount of dust discharged to the space 7 is decreased.

Moreover, according to the above structure, since the recess 200 is located inside the labyrinth forming portion 47, the recess 200 does not project from the top cover 4. Thus, the thickness of the housing 2 does not increase.

When the present invention is implemented, the number of mounted magnetic disks is not limited to that specified in the above embodiments. For example, the number of magnetic disks may be three or more.

The bearing is not limited to the ball bearing, and it may be a roller bearing.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic disk apparatus comprising:

a housing having a base with a bottom wall, and a cover plate placed on the base, the cover plate being situated opposite and parallel to said bottom wall, the housing having a sealed space defined between the base and the cover plate;

an electric motor situated in said space within the housing, said electric motor including a shaft with a first end fixed on said bottom wall and a second end fixed on said cover plate, the second end of the shaft having an end surface which is flat and parallel to a direction perpendicular to an axis of said shaft, a rotor situated coaxially around said shaft having an end portion opposite said cover plate, and first and second bearings interposed between said rotor and said shaft for rotatably supporting said rotor on an outer peripheral surface of said shaft;

a magnetic recording medium supported on said rotor and rotated along with said rotor within said space; and a magnetic head for writing and reading data on said magnetic recording medium, said magnetic head levitating over the magnetic recording medium while the magnetic recording medium is being rotated, wherein said rotor includes a seal portion interposed between said cover plate and said first bearing, said seal portion includes a first surface located near the outer peripheral surface of the shaft and defining a first gap between the first surface itself and the outer peripheral surface of the shaft and a second surface located near the cover plate, said cover plate having a labyrinth forming portion which defines an indentation that is formed by indenting said cover plate toward said bottom wall, said labyrinth forming portion having a substantially flat seal surface which is defined by a bottom of the indentation and faces the second surface of said seal portion, said seal surface is brought into contact with the end surface of the shaft, a second gap is determined thereby between said second surface and said seal surface, said first gap and said second gap cooperate with each other to form a labyrinth seal between said cover plate and said first bearing, said labyrinth forming portion is fixed on the second end of said shaft by a screw having a head, said screw is driven into said second end through said labyrinth forming portion, and the head of the screw is placed in the indentation of said labyrinth forming portion.

2. The magnetic disk apparatus according to claim 1, wherein the first surface of said seal portion has a recess extending continuously in the circumferential direction of said shaft, said shaft has a large-diameter portion projecting into said recess, and said recess and said projection cooperate to define a crank-shaped bent portion midway in said first gap.

3. The magnetic disk apparatus according to claim 2, wherein the second surface of said seal portion has a recess extending continuously in the circumferential direction of said shaft, said seal surface has a projection projecting into said recess, and said recess and said projection cooperate to define a crank-shaped bent portion midway in said second gap.

4. The magnetic disk apparatus according to claim 1, wherein the second surface of said seal portion has a recess extending continuously in the circumferential direction of said shaft, said seal surface has a projection projecting into said recess, and said recess and said projection cooperate to define a crank-shaped bent portion midway in said second gap.

5. The magnetic disk apparatus according to claim 4, wherein said labyrinth forming portion and said projection are formed by subjecting a metallic plate to a press machining process, and said projection is formed integral with said cover plate when said cover plate is formed.

6. The magnetic disk apparatus according to claim 4, wherein said projection is formed of a separate member separated from said cover plate, and said separate member is fixed to said cover plate.

7. The magnetic disk apparatus according to claim 1, wherein said rotor has a cylindrical hub containing said first and second bearings, and said labyrinth forming portion is coaxial with said hub and has substantially the same outside diameter as said hub.

8. The magnetic disk apparatus according to claim 1, wherein the second surface of said seal portion has a projection projecting towards said second gap and extending continuously in the circumferential direction of said shaft, the seal surface of said labyrinth forming portion has a recess into which said projection projects, and said recess and said projection cooperate to define a crank-shaped bent portion midway in said second gap.

9. The magnetic disk apparatus according to claim 8, wherein the depth dimension of said recess is less than the depth of the indentation of said labyrinth forming portion.

10. A magnetic disk apparatus comprising:

a housing having a base with a bottom wall, and a cover plate placed on the base, the cover plate being situated opposite and parallel to said bottom wall, said housing having a sealed space defined between the base and the cover plate;

an electric motor situated in said space within the housing, said electric motor including a shaft with a first end fixed on said bottom wall and a second end fixed on said cover plate, the second end of said shaft having an end surface which is flat and parallel to a direction perpendicular to an axis of the shaft, a rotor situated coaxially around said shaft having an end portion opposite said cover plate, and first and second bearings interposed between said rotor and said shaft for rotatably supporting said rotor on an outer peripheral surface of said shaft;

a magnetic recording medium supported on said rotor and rotated along with said rotor within said space; and a magnetic head for writing and reading data, said magnetic head levitating over the magnetic recording medium while the magnetic recording medium is being rotated, wherein said cover plate has a labyrinth forming portion opposite said end portion of said rotor, said labyrinth forming portion defines an indentation that is formed by indenting said cover plate toward said bottom wall and has a substantially flat seal surface which is defined by a bottom of the indentation, said rotor includes a seal member interposed between said seal surface and said first bearing, and said seal member cooperates with the outer peripheral surface of the shaft and said seal surface to form a gap constituting a labyrinth seal between said space and said first bearing, said labyrinth forming portion is fixed on the second end of said shaft by a screw having a head such that said seal surface contacts the end surface of said shaft and faces the seal member, said screw is driven into the second end of said shaft through said labyrinth forming portion, and the head of the screw is placed in the indentation of said labyrinth forming portion.

11. The magnetic disk apparatus according to claim 10, wherein said seal member includes a first surface located near the outer peripheral surface of the shaft and defining a first gap between the first surface itself and the outer peripheral surface of the shaft and a second surface located near the seal surface of said cover plate and defining a second gap between the second surface itself and the seal surface of said cover plate, and said first and second gaps communicate with each other to form the labyrinth seal between said space and said bearing.

12. The magnetic disk apparatus according to claim 11, wherein the first surface of said seal member has a recess extending continuously in the circumferential direction of said shaft, said shaft has a large-diameter portion projecting into said recess, and said recess and said projection cooperate to define a crank-shaped bent portion midway in said first gap.

13. The magnetic disk apparatus according to claim 11, wherein the second surface of said seal member has a recess extending continuously in the circumferential direction of said shaft, said seal surface of said labyrinth forming portion has a projection projecting into said recess, and said recess and said projection cooperate to define a crank-shaped bent portion midway in said second gap.

14. The magnetic disk apparatus according to claim 13, wherein said labyrinth forming portion and said projection are formed by subjecting a metallic plate to a press machining process, and said projection is formed integral with said cover plate when said cover plate is formed.

15. The magnetic disk apparatus according to claim 13, wherein said projection is formed of a separate member separated from said cover plate, and said separate member is fixed to said cover plate.

16. The magnetic disk apparatus according to claim 12, wherein the second surface of said seal member has a recess extending continuously in the circumferential direction of said shaft, said seal surface of said labyrinth forming portion has a projection projecting into said recess, and said recess and said projection cooperate to define a crank-shaped bent portion midway in said second gap.

17. The magnetic disk apparatus according to claim 10, wherein said rotor has a cylindrical hub containing said first and second bearings, and said labyrinth forming portion is coaxial with said hub and has substantially the same outside diameter as said hub.

18. The magnetic disk apparatus according to claim 10, wherein the second surface of said seal member has a projection projecting towards said second gap and extending continuously in the circumferential direction of said shaft, the seal surface of said labyrinth forming portion has a recess into which said projection projects, and said recess and said projection cooperate to define a crank-shaped bent portion midway in said second gap.

19. The magnetic disk apparatus according to claim 18, wherein the depth dimension of said recess is less than the depth of indentation of said labyrinth forming portion.

20. A magnetic disk apparatus comprising:

a housing having a base with a bottom wall, and a cover plate placed on the base, the cover plate being situated opposite and parallel to said bottom wall, the housing having a sealed space defined between the base and the cover plate;

an electric motor situated in said space within the housing, said electric motor including a shaft with a first end fixed on said bottom wall and a second end fixed on said cover plate, the second end of the shaft having an end surface which is flat and parallel to a direction perpendicular to an axis of said shaft, a rotor situated coaxially around said shaft having an end portion opposite said cover plate, and first and second bearings interposed between said rotor and said shaft for rotatably supporting said rotor on an outer peripheral surface of said shaft;

a magnetic recording medium supported on said rotor and rotated along with said rotor within said space; and a magnetic head for writing and reading data on said magnetic recording medium, said magnetic head levitating over the magnetic recording medium while the magnetic recording medium is being rotated, wherein said rotor includes a seal portion interposed between said cover plate and said first bearing, said seal portion includes a first surface located near the outer peripheral surface of the shaft and defining a first gap between the first surface itself and the outer peripheral surface of the shaft and a second surface located near the cover plate, said cover plate having a labyrinth forming portion which defines an indentation that is formed by indenting said cover plate toward said bottom wall, said labyrinth forming portion having a substantially flat seal surface at a bottom of the indentation, a first portion of said seal surface faces the second surface of said seal portion, a second portion of said seal surface is brought into contact with the end surface of the shaft, a second gap is thereby defined between said second surface and said seal surface, said first gap and said second gap cooperate with each other to form a labyrinth seal between said cover plate and said first bearing, said labyrinth forming portion is fixed on the second end of said shaft by a screw having a head, said screw is driven into said second end through said labyrinth forming portion, and the head of the screw is placed in the indentation of said labyrinth forming portion.

21. The magnetic disk apparatus according to claim 20, wherein the first surface of said seal portion has a recess extending continuously in the circumferential direction of said shaft, said shaft has a large-diameter portion projecting into said recess, and said recess and said projection cooperate to define a crank-shaped bent portion midway in said first gap.

22. The magnetic disk apparatus according to claim 21, wherein the second surface of said seal portion has a recess extending continuously in the circumferential direction of said shaft, said seal surface has a projection projecting into said recess, and said recess and said projection cooperate to define a crank-shaped bent portion midway in said second gap.

23. The magnetic disk apparatus according to claim 20, wherein the second surface of said seal portion has a recess extending continuously in the circumferential direction of said shaft, said seal surface has a projection projecting into said recess, and said recess and said projection cooperate to define a crank-shaped bent portion midway in said second gap.

24. The magnetic disk apparatus according to claim 23, wherein said labyrinth forming portion and said projection are formed by subjecting a metallic plate to a press machining process, and said projection is formed integral with said cover plate when said cover plate is formed.

25. The magnetic disk apparatus according to claim 23, wherein said projection is formed of a separate member separated from said cover plate, and said separate member is fixed to said cover plate.

26. The magnetic disk apparatus according to claim 20, wherein said rotor has a cylindrical hub containing said first and second bearings, and said labyrinth forming portion is coaxial with said hub and has substantially the same outside diameter as said hub.

27. The magnetic disk apparatus according to claim 20, wherein the second surface of said seal portion has a projection projecting towards said second gap and extending continuously in the circumferential direction of said shaft, the seal surface of said labyrinth forming portion has a recess into which said projection projects, and said recess and said projection cooperate to define a crank-shaped bent portion midway in said second gap.

28. The magnetic disk apparatus according to claim 27, wherein the depth dimension of said recess is less than the depth of the indentation of said labyrinth forming portion.

\* \* \* \* \*